(12) United States Patent
Ouchi et al.

(10) Patent No.: US 8,895,175 B2
(45) Date of Patent: Nov. 25, 2014

(54) INTERCELLULAR SEPARATION STRUCTURE BODY AND LAMINATE TYPE SOLID SECONDARY BATTERY PROVIDED WITH THE SAME

(75) Inventors: Masutaka Ouchi, Nagaokakyo (JP); Koichi Watanabe, Nagaokakyo (JP); Kunio Nishida, Nagaokakyo (JP); Hitomi Nishida, legal representative, Nagaokakyo (JP); Takafumi Iwaguchi, legal representative, Nagaokakyo (JP)

(73) Assignee: Murata Manufacturing Co., Ltd., Nagaokakyo-Shi, Kyoto-fu (JP)

( * ) Notice: Subject to any disclaimer, the term of this patent is extended or adjusted under 35 U.S.C. 154(b) by 0 days.

(21) Appl. No.: 13/365,320

(22) Filed: Feb. 3, 2012

(65) Prior Publication Data

US 2012/0171549 A1    Jul. 5, 2012

Related U.S. Application Data

(63) Continuation of application No. PCT/JP2010/003473, filed on May 25, 2010.

(30) Foreign Application Priority Data

Sep. 17, 2009   (JP) .................... 2009-215457

(51) Int. Cl.
*H01M 2/22*      (2006.01)
*H01M 2/24*      (2006.01)
(Continued)

(52) U.S. Cl.
CPC ............ *H01M 2/22* (2013.01); *H01M 2/204* (2013.01); *H01M 2/24* (2013.01); *H01M 2/202* (2013.01); *H01M 2/1646* (2013.01); *H01M 2/18* (2013.01); *H01M 4/66* (2013.01); *H01M 4/70* (2013.01); *H01M 10/052* (2013.01); *H01M 10/0562* (2013.01); *Y02E 60/122* (2013.01)

USPC .......................................... 429/142; 429/129

(58) Field of Classification Search
USPC ................................. 429/129, 142
See application file for complete search history.

(56) References Cited

U.S. PATENT DOCUMENTS 6,852,436 B2 *   2/2005   Badding et al. ............... 429/465
2004/0041537 A1*   3/2004   Ishida et al. ................. 320/107
(Continued)

FOREIGN PATENT DOCUMENTS

CN    1755975 A     4/2006
CN    100483831 C   4/2009
(Continued)

OTHER PUBLICATIONS

PCT/JP2010/003473/003473 Written Opinion dated Aug. 19, 2010.
(Continued)

*Primary Examiner* — Ula C. Ruddock
*Assistant Examiner* — Scott J Chmielecki
(74) *Attorney, Agent, or Firm* — Dickstein Shapiro LLP

(57) ABSTRACT

An intercellular separation structure body capable of electrically connecting a plurality of unit cells that include a laminate type solid secondary battery with each other, and capable of ion-conductively insulating a positive electrode layer and a negative electrode layer in two adjacent unit cells, as well as a laminate type solid secondary battery provided with the same. The intercellular separation structure body is an intercellular separation structure body disposed between a plurality of unit cells each of which includes a positive electrode layer, a solid electrolyte layer, and a negative electrode layer that are sequentially stacked in a laminate type solid secondary battery. This intercellular separation structure body includes an insulating layer that electroconductively and ion-conductively insulates the plurality of unit cells from each other and an electroconductive section that is formed within the insulating layer and electrically connects the plurality of unit cells with each other.

9 Claims, 9 Drawing Sheets

(51) Int. Cl.
*H01M 2/20* (2006.01)
*H01M 2/16* (2006.01)
*H01M 2/18* (2006.01)
*H01M 4/66* (2006.01)
*H01M 4/70* (2006.01)
*H01M 10/052* (2010.01)
*H01M 10/0562* (2010.01)

(56) References Cited

U.S. PATENT DOCUMENTS

2006/0073388 A1* 4/2006 Harada et al. ............. 429/245
2008/0220330 A1* 9/2008 Hosaka et al. ............ 429/209
2008/0226976 A1* 9/2008 Stimits .................... 429/131
2009/0197161 A1  8/2009 Nakamura

FOREIGN PATENT DOCUMENTS

| | | |
|---|---|---|
| CN | 101490892 A | 7/2009 |
| JP | 11-345604 A | 12/1999 |
| JP | 2000-100471 A | 4/2000 |
| JP | 2003-168416 A | 6/2003 |
| JP | 2004-158222 A | 6/2004 |
| JP | 2006-190649 A | 7/2006 |
| JP | 2007-066806 A | 3/2007 |
| JP | 2008-027659 A | 2/2008 |
| JP | 2010-073500 A | 4/2010 |

OTHER PUBLICATIONS

Chinese Office Action issued Jan. 2, 2014 for corresponding application CN 201080042015.4 with English translation.

* cited by examiner

US 8,895,175 B2

INTERCELLULAR SEPARATION STRUCTURE BODY AND LAMINATE TYPE SOLID SECONDARY BATTERY PROVIDED WITH THE SAME

CROSS REFERENCE TO RELATED APPLICATIONS

The present application is a continuation of International application No. PCT/JP2010/003473, filed May 25, 2010, which claims priority to Japanese Patent Application No. 2009-215457, filed Sep. 17, 2009, the entire contents of each of which are incorporated herein by reference.

FIELD OF THE INVENTION

The present invention generally relates to an intercellular separation structure body and a laminate type solid secondary battery provided with the same, and more particularly to an intercellular separation structure body for connecting unit cells in series in a laminate type secondary battery and a laminate type solid secondary battery provided with the same.

BACKGROUND OF THE INVENTION

In recent years, a battery, particularly a secondary battery, is used as a power source of a portable electronic apparatus such as a portable phone, a portable personal computer, or the like. As one example of a secondary battery, a lithium ion secondary battery is known to have a relatively large energy density. In such a secondary battery, a liquid electrolyte (electrolytic solution) such as an organic solvent has been conventionally used as a medium for moving ions. However, in a secondary battery using an electrolytic solution, there is a problem such as leakage of the electrolytic solution. Therefore, development of a laminate type solid secondary battery in which all the constituent elements are constituted with a solid using a solid electrolyte has been proceeding.

As a structure of such a laminate type solid secondary battery, for example, Japanese Patent Application Laid-open (JP-A) No. 2004-158222 Gazette (hereafter referred to as Patent Document 1) discloses a structure of a multilayer lamination battery in which, with a thin film solid lithium ion secondary battery constituting one cell, the battery cells are stacked in plural stages.

One structure disclosed in Patent Document 1 is constituted in such a manner that, in a laminate type solid secondary battery in which a plurality of power-generating elements each of which is constituted by stacking a positive electrode layer, a solid electrolyte layer, a negative electrode layer, and a current-collecting layer are stacked, the layers are sequentially stacked on one substrate without using a new insulating layer between individual power-generating elements, by using a function such that the current-collecting layer (metal film) will be an ion-conductively insulating film.

The other structure disclosed in Patent Document 1 is constituted in such a manner that, in a laminate type solid secondary battery in which a plurality of power-generating elements each of which is constituted by stacking a positive electrode layer, a solid electrolyte layer, a negative electrode layer, and a current-collecting layer are stacked via an insulating layer having an electroconductively and ion-conductively insulating property, leading tabs provided in the outer peripheral parts of the current-collecting layers are disposed to lead to the outside of the laminate body in a direction perpendicular to the laminate body direction; a via hole for connection penetrating through the insulating layer is provided in those leading tabs; the via hole is made so that metal electrodes can be embedded and connected; and connection of series type, parallel type, or series parallel type can be selected by combination of these connections.

Patent Document 1: Japanese Patent Application Laid-open (JP-A) No. 2004-158222 Gazette

SUMMARY OF THE INVENTION

In the one structure of the laminate type solid secondary battery disclosed in Patent Document 1, the unit cells are connected electrically in series via the current-collecting layer by disposing the positive electrode layer on one surface of the current-collecting layer and disposing the negative electrode layer on the other surface thereof. However, in this laminate type solid secondary battery, when the positive electrode layer and the negative electrode layer are ion-conducted via the current-collecting layer, only the ion-conducted positive electrode layer and negative electrode layer are discharged, thereby considerably deteriorating the battery characteristics of the laminate type solid secondary battery. Also, in order to insulate the ion-conductivity of the current-collecting layer substantially, a device such as making the current-collecting layer be a poreless continuous film or sufficiently ensuring the thickness of the current-collecting layer needs to be made. In the former case, it will be difficult to apply a technique such as the sputtering method or the screen printing of an electroconductive material that is generally used as a method of forming the current-collecting layer. In the latter case, there is a problem of an increase in the amount of use of the electroconductive material (metal paste or the like) constituting the current-collecting layer.

On the other hand, in the other laminate type solid secondary battery disclosed in Patent Document 1, the unit cells are electroconductively and ion-conductively insulated from each other by the insulating layer, and the unit cells are connected electrically in series and/or in parallel by the leading tabs disposed on the outside of the unit cells. Since the insulating layer is used in order to insulate the unit cells electroconductively and ion-conductively from each other, the positive electrode layer and the negative electrode layer are not ion-conductively conducted via the current-collecting layer even when the current-collecting layer substantially has an ion-conductive property. This can prevent the battery characteristics of the laminate type solid secondary battery from being deteriorated.

However, since the unit cells are electrically connected on the outside of the unit cells by using a leading tab disposed for each unit cell, approximately the same number of leading tabs as that of the unit cells are needed. Also, a capacity for disposing the leading tabs needs to be provided in the laminate type solid secondary battery.

Therefore, an object of the present invention is to provide an intercellular separation structure body capable of electrically connecting a plurality of unit cells constituting a laminate type solid secondary battery with each other and capable of ion-conductively insulating a positive electrode layer and a negative electrode layer in two adjacent unit cells, as well as a laminate type solid secondary battery provided with the same.

The intercellular separation structure body according to this invention is an intercellular separation structure body disposed between a plurality of unit cells each of which is constituted with a positive electrode layer, a solid electrolyte layer, and a negative electrode layer sequentially stacked in a laminate type solid secondary battery. The intercellular separation structure body includes an insulating section that electroconductively and ion-conductively insulates the plurality of unit cells from each other; and an electroconductive section that is formed within the insulating section and electrically connects the plurality of unit cells with each other.

When the intercellular separation structure body of this invention is disposed between the plurality of unit cells constituting the laminate type solid secondary battery, the plurality of unit cells are stacked via the insulating layer in which the electroconductive section having an electric conduction property is formed in the inside. This allows that the positive electrode layer and the negative electrode layer can be ion-conductively insulated from each other efficiently in two adjacent unit cells with only a small amount of electroconductive material used in the electroconductive section irrespective of the presence or absence of a current-collecting layer. Also, the two unit cells adjacent to the insulating layer can be electrically connected. Therefore, the unit cells constituting a laminate type solid secondary battery can be electrically connected while reducing the number of external current-collecting members such as leading tabs as much as possible, and also the positive electrode layer and the negative electrode layer can be ion-conductively insulated from each other efficiently irrespective of the presence or absence of a current-collecting layer, so that an intercellular separation structure body being excellent in space utilization ratio and cost performance can be imparted to the laminate type solid secondary battery.

In the intercellular separation structure body of this invention, the insulating section and the electroconductive section are preferably formed by co-sintering.

In the intercellular separation structure body of this invention, the electroconductive section preferably includes an electroconductive material that fills at least one through-hole formed in the insulating section.

By adopting such a constitution, the amount of use of the electrically conductive material used in the electroconductive section can be reduced, and also the electric resistance of the electroconductive section can be limited to the minimum.

Further, in the intercellular separation structure body of this invention, the electroconductive material preferably includes at least one kind selected from the group consisting of an electroconductive oxide and a metal.

In the intercellular separation structure body of this invention, when through-holes are formed in the insulating section, it is preferable that first and second through-holes are formed in the insulating section, and first and second electroconductive sections formed respectively by filling the first and second through-holes with an electroconductive material are electrically connected with each other.

By disposing a plurality of electroconductive sections within the same insulating section in this manner, the value of the electric current flowing through one electroconductive section can be reduced, and the electric resistance of the insulating layer in the stacking direction can be reduced. Further, by electrically connecting a plurality of conductive sections formed by filling the through-hole with an electroconductive material in the same insulating section, the value of the electric current flowing through each electroconductive section can be averaged. As a result, the electric resistance of the insulating layer in the stacking direction can be further reduced.

The laminate type solid secondary battery according to the present invention includes a plurality of unit cells each of which is constituted with a positive electrode layer, a solid electrolyte layer, and a negative electrode layer that are sequentially stacked; and the intercellular separation structure body having any one of the above-described characteristics that is disposed between the plurality of unit cells.

In a laminate type solid secondary battery constituted in this manner, the intercellular separation structure bodies are disposed between the plurality of unit cells, so that the plurality of unit cells are stacked via the insulating layer in which the electroconductive section having an electric conduction property is formed in the inside. This allows that the positive electrode layer and the negative electrode layer can be ion-conductively insulated from each other efficiently in two adjacent unit cells with only a small amount of electroconductive material used in the electroconductive section irrespective of the presence or absence of a current-collecting layer. Also, the two unit cells adjacent to the insulating layer can be electrically connected. Therefore, the unit cells constituting the laminate type solid secondary battery can be electrically connected while reducing the number of external current-collecting members such as leading tabs as much as possible, and also the positive electrode layer and the negative electrode layer can be ion-conductively insulated from each other efficiently irrespective of the presence or absence of a current-collecting layer, so that a laminate type solid secondary battery being excellent in space utilization ratio and cost performance can be obtained.

In the laminate type solid secondary battery of this invention, the unit cell further preferably includes a current-collecting layer having an electroconductive property that is disposed on at least one of the positive electrode layer and the negative electrode layer disposed on the intercellular separation structure body side.

In this manner, by disposing a current-collecting layer having a electric conduction property on the positive electrode layer (or the negative electrode layer) adjacent to the insulating layer, the electric current passing through the current-collecting layer can be averaged in the surface direction (direction perpendicular to the stacking direction), and the local electric current concentration within the unit cell can be restrained. As a result, the electric resistance of the laminate type solid secondary battery can be reduced. Therefore, when the current-collecting layer is capable of electric conduction in the surface direction (direction perpendicular to the stacking direction), the above-described effect can be obtained irrespective of the thickness of the current-collecting layer, so that the thickness of the current-collecting layer can be made to be extremely small within a range such that the current-collecting layer is capable of electric conduction in the surface direction (direction perpendicular to the stacking direction). Further, since the current-collecting layer does not need to be ion-conductively insulating, the above-described effect can be obtained when the current-collecting layer is capable of electric conduction in the surface direction (direction perpendicular to the stacking direction) even if the current-collecting layer has pores therein.

In the laminate type solid secondary battery of this invention, an electroconductive material that forms the current-collecting layer preferably includes at least one kind selected from the group consisting of an electroconductive oxide and a metal.

The laminate type solid secondary battery of this invention further preferably includes an external electrode that is disposed on an outside surface of a laminate body formed by stacking the plurality of unit cells.

The end surface of each of the unit cells located at the uppermost stage and at the lowermost stage of the laminate type solid secondary battery does not need to be ion-conductively insulated, so that there is not necessarily a need to dispose an insulating layer. Therefore, by disposing an external electrode having an electric conduction property on the end surface of each of the unit cells located at the uppermost stage and at the lowermost stage of the laminate type solid secondary battery as described above, the electric resistance of the laminate type solid secondary battery can be reduced.

Also, the laminate type solid secondary battery of this invention preferably includes a first laminate body, a second laminate body, a first external electrode, a second external electrode, and a third external electrode. The first laminate body is formed by stacking a plurality of unit cells each of which is constituted with a positive electrode layer, a solid electrolyte layer, and a negative electrode layer that are sequentially stacked, while disposing the intercellular separation structure body between the plurality of unit cells. The second laminate body is formed by stacking a plurality of unit cells each of which is constituted with a positive electrode layer, a solid electrolyte layer, and a negative electrode layer that are sequentially stacked, while disposing the intercellular separation structure body between the plurality of unit cells. The first external electrode is disposed between one electrode layer, which is one of the positive electrode layer and the negative electrode layer, positioned on one side surface of the first laminate body and the one electrode layer positioned on one side surface of the second laminate body. The second external electrode is disposed on the other electrode layer, which is opposite to the one electrode layer, positioned on the other side surface of the first laminate body. The third external electrode is disposed on the other electrode layer positioned on the other side surface of the second laminate body. The second external electrode and the third external electrode are electrically connected with each other.

By adopting such a constitution, a laminate type solid secondary battery in which m pieces of power-generating elements each constituted by connecting n pieces of unit cells in series are connected in parallel can be constituted, for example, by stacking the power-generating elements each constituted by connecting n pieces of unit cells in series while allowing the first external electrode to intervene between the one electrode layers having the same polarity among the m pieces of power-generating elements and electrically connecting between the other electrode layers with the second and third external electrodes. Therefore, a laminate type solid secondary battery exhibiting a capacity of m-multiple as compared with a laminate type solid secondary battery constituted by connecting n pieces of unit cells in series can be easily constituted.

In the laminate type solid secondary battery of this invention, an electroconductive material that forms the external electrode preferably includes at least one kind selected from the group consisting of an electroconductive oxide and a metal.

Further, the laminate type solid secondary battery of this invention is a laminate type solid secondary battery, formed by preparing m pieces of laminate bodies each of which is formed by stacking a plurality of unit cells each of which is constituted with a positive electrode layer, a solid electrolyte layer, and a negative electrode layer that are sequentially stacked, while disposing the intercellular separation structure body between the plurality of unit cells, and stacking the m pieces of laminate bodies while disposing m−1 pieces of external electrodes between the m pieces of laminate bodies, and has the following characteristics. Two laminate bodies adjacent to one external electrode are stacked and electrically connected so that the positive electrode side or the negative electrode side will be adjacent to both sides of the external electrode. An external electrode is also disposed on a surface of the laminate bodies positioned on the first stage and on the m-th stage that is not adjacent to the external electrodes of the laminate bodies. The external electrodes having the same polarity are electrically connected with an external current-collecting member. This allows the laminate type solid secondary battery of this invention to include a structure in which at least two laminate bodies are connected electrically in parallel.

In the laminate type solid secondary battery of this invention, an electroconductive material that forms the external electrode preferably includes at least one kind selected from the group consisting of an electroconductive oxide and a metal. The electroconductive material that forms the external electrode preferably includes a metal.

As described above, according to this invention, the unit cells constituting a laminate type solid secondary battery can be electrically connected while reducing the number of external current-collecting members such as leading tabs as much as possible, and also the positive electrode layer and the negative electrode layer can be ion-conductively insulated from each other efficiently irrespective of the presence or absence of a current-collecting layer, so that an intercellular separation structure body being excellent in space utilization ratio and cost performance can be imparted to the laminate type solid secondary battery.

DETAILED DESCRIPTION OF THE INVENTION

Hereafter, the embodiments of this invention will be described with reference to the drawings.

First Embodiment

First, a laminate body constituting a first basic structure of a laminate type solid secondary battery as the first embodiment of this invention will be described. Here, in each of the later described embodiments of the present invention, the planar shape of the laminate body is not limited; however, description will be given by assuming that the shape is generally rectangular, for example.

Figure 1:
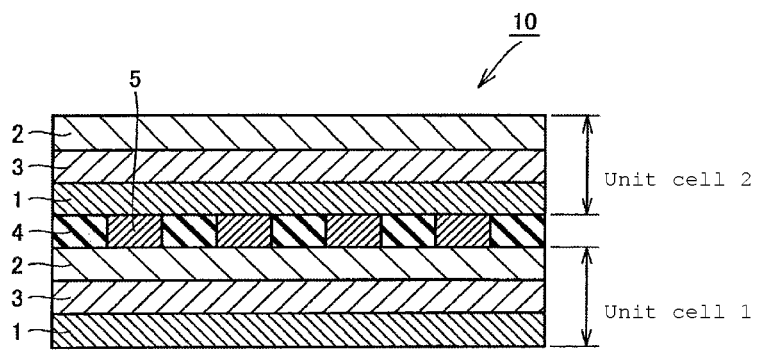
FIG. 1 is a cross-sectional view schematically illustrating a cross-sectional structure of a laminate type solid secondary battery as the first embodiment of this invention.

Referring to FIG. 1, in a laminate type solid secondary battery 10, two unit cells 1 and 2 are stacked via an intercellular separation structure body. Each of the unit cells 1 and 2 is constituted with a positive electrode layer 1, a solid electrolyte layer 3, and a negative electrode layer 2 that are sequentially stacked.

The intercellular separation structure body is constituted with an insulating layer 4 serving as an insulating section and a plurality of electroconductive sections 5 formed within the insulating layer 4. The insulating layer 4 electroconductively and ion-conductively insulates the two unit cells 1 and 2 from each other. The electroconductive section 5 electrically connects the two unit cells 1 and 2 with each other. The unit cells 1, 2 and the insulating layer 4 are stacked so that the positive electrode layer 1 of the unit cell 2 may be adjacent to one side surface (upper surface) of the insulating layer 4 and the negative electrode layer 2 of the unit cell 1 may be adjacent to the other side surface (lower surface) of the insulating layer 4.

The electroconductive section 5 includes an electroconductive material that fills a plurality of through-holes formed in the insulating layer 4. The through-holes are formed so as to penetrate through the insulating layer 4 in the stacking direction.

In the laminate type solid secondary battery 10 constituted as shown above, the two unit cells 1 and 2 adjacent to the insulating layer 4 are connected electrically in series without using an external current-collecting member such as a leading tab because the electroconductive section 5 disposed in the insulating layer 4 is in contact with the positive electrode layer 1 of the unit cell 2 and the negative electrode layer 2 of the unit cell 1 adjacent to the insulating layer 4. Also, the positive electrode layer 1 of the unit cell 2 and the negative electrode layer 2 of the unit cell 1 are ion-conductively insulated from each other by stacking the two unit cells 1 and 2 via the insulating layer 4.

This allows that the positive electrode layer 1 of the unit cell 2 and the negative electrode layer 2 of the unit cell 1 can be ion-conductively insulated from each other efficiently without using an external current-collecting member such as a leading tab or a current-collecting layer, and also the two unit cells 1 and 2 adjacent to the insulating layer 4 can be electrically connected with each other.

Here, the kind of the electroconductive material is not particularly limited; however, the electroconductive material can be selected from an electroconductive oxide, a metal, a mixture of an electroconductive oxide with a metal, and the like. A method of forming the electroconductive section 5 is not particularly limited, and a method such as constituting the electroconductive section 5 by preparing a paste-like electroconductive material in a paste form and filling the through-hole with the electroconductive material or by disposing a metal wire in the through-hole may be adopted. The insulating layer 4 and the electroconductive section 5 may be constituted with a material formed by co-sintering.

Second Embodiment

Next, a laminate body constituting a second basic structure of the laminate type solid secondary battery will be described as the second embodiment of this invention.

Figure 2:
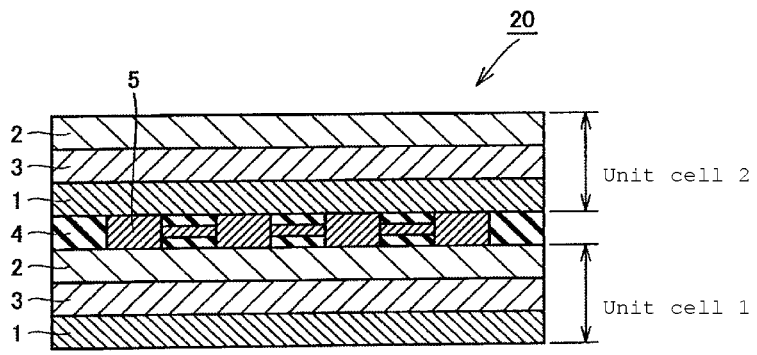
FIG. 2 is a cross-sectional view schematically illustrating a cross-sectional structure of a laminate type solid secondary battery as the second embodiment of this invention.
Figure 3A:
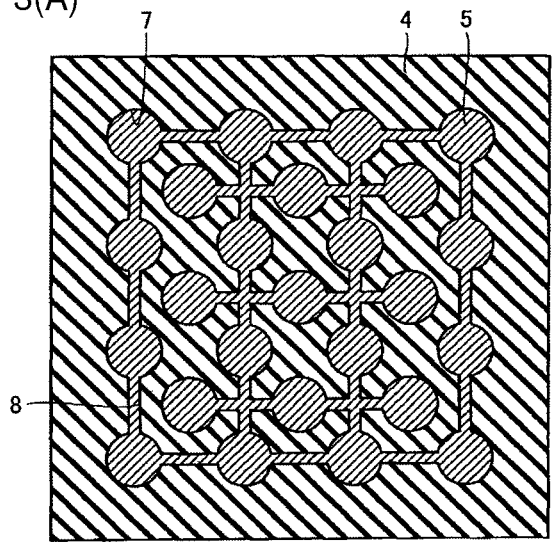
FIG. 3(A) is a plan view illustrating a planar constitution and FIG. 3(B) is a cross-sectional view illustrating a cross-sectional constitution, both of an insulating section in the laminate type solid secondary battery shown in FIG. 2.
Figure 3B:
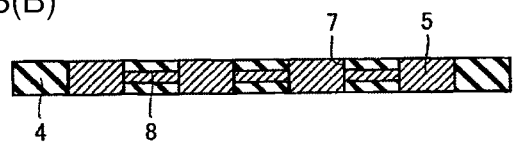

Referring to FIG. 2, in a laminate type solid secondary battery 20, the two unit cells 1 and 2 are stacked via an intercellular separation structure body in the same manner as in FIG. 1. Referring to FIG. 3, a first through-hole 7 and a second through-hole 8 are formed in the insulating layer 4. The second through-hole 8 is formed so that a plurality of adjacent first through-holes 7 may be in communication with each other. The first through-hole 7 is formed so as to penetrate through the insulating layer 4 in the stacking direction, and the second through-hole 8 is formed so as to penetrate through the insulating layer 4 by extending in a direction approximately orthogonal to the stacking direction, that is, the plane direction. The second through-hole 8 forms a hollow structure in the insulating layer 4. By filling the first and second through-holes 7 and 8 each with an electroconductive material, the electroconductive section 5 including first and second electroconductive sections is formed. In this manner, in the electroconductive section 5, the first and second electroconductive sections formed by respectively filling the first and second through-holes 7 and 8 with an electroconductive material are electrically connected with each other.

Here, the other constitution of the laminate type solid secondary battery 20 is the same as that of the laminate type solid secondary battery 10 shown in FIG. 1.

In the laminate type solid secondary battery 20 constituted as shown above, by forming the first through-hole 7 to extend in the stacking direction of the insulating layer 4 for electrically connecting the two unit cells 1 and 2, and forming the second through-hole 8 in a direction approximately orthogonal to the stacking direction of the insulating layer 4, that is, the plane direction, and filling the first and second through-holes 7 and 8 with an electroconductive material, the electroconductive section 5 extending in the stacking direction and in the plane direction in the insulating layer 4 is formed. This allows that, by electrically connecting the electroconductive section 5 in the stacking direction and in the plane direction in the insulating layer 4, the value of the electric current flowing through the electroconductive section 5 can be averaged in the plane direction of the insulating layer 4. As a result, the electric resistance of the insulating layer 4 in the stacking direction can be reduced.

Here, the laminate type solid secondary battery 20 is described as an example in which the approximately cylindrical first through-holes 7 are arranged at an equal interval in the insulating layer 4, and the second through-hole 8 having a hollow structure and formed in the insulating layer 4 connects all of the first through-holes 7. However, the shape, disposition, and number of the first through-holes 7 and the second through-holes 8 are not particularly limited, and the same effect can be obtained even when some of the first through-holes 7 are connected by the second through-hole 8.

Also, in the laminate type solid secondary battery 20 as well, the functions and effects similar to those of the laminate type solid secondary battery 10 shown in FIG. 1 can be obtained.

Third Embodiment

Next, a laminate body constituting a third basic structure of the laminate type solid secondary battery will be described as the third embodiment of this invention.

Figure 4:
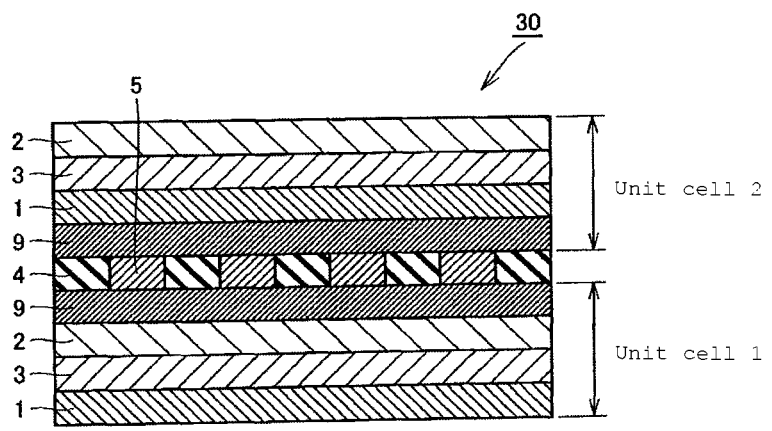
FIG. 4 is a cross-sectional view schematically illustrating a cross-sectional structure of a laminate type solid secondary battery as the third embodiment of this invention.

Referring to FIG. 4, in a laminate type solid secondary battery 30, the two unit cells 1 and 2 are stacked via an intercellular separation structure body in the same manner as in FIG. 1. In the unit cell 1, a current-collecting layer 9 having an electric conduction property is formed on the surface of the negative electrode layer 2 disposed on the side of the intercellular separation structure body, that is, on the side of the insulating layer 4. In the unit cell 2, another current-collecting layer 9 having an electric conduction property is formed on the surface of the positive electrode layer 1 disposed on the side of the intercellular separation structure body, that is, on the side of the insulating layer 4. In other words, the unit cells 1 and 2 are constituted by disposing the current-collecting layer 9 having an electric conduction property on the surface of each of the positive electrode layer 1 and the negative electrode layer 2 that is not adjacent to the solid electrolyte layer 3. Here, the current-collecting layer 9 may be disposed on one of the positive electrode layer 1 and the negative electrode layer 2 disposed on the side of the insulating layer 4.

Here, the other constitution of the laminate type solid secondary battery 30 is the same as that of the laminate type solid secondary battery 10 shown in FIG. 1.

In the laminate type solid secondary battery 30 constituted as shown above, by disposing the current-collecting layer 9 having an electric conduction property between the positive electrode layer 1 (the negative electrode layer 2) and the insulating layer 4, the electric current passing through the current-collecting layer 9 can be averaged in the direction perpendicular to the stacking direction, and the local electric current concentration within the unit cell 1 or the unit cell 2 can be restrained. As a result, the electric resistance of the laminate type solid secondary battery 30 can be reduced.

Here, the laminate type solid secondary battery 30 is described as an example in which the current-collecting layer 9 is disposed on the positive electrode layer 1 and the negative electrode layer 2 that are in contact with the insulating layer 4. However, the above functions and effects can be obtained as well even when the current-collecting layer 9 is disposed only on the positive electrode layer 1 or only on the negative electrode layer 2.

Also, when the current-collecting layer 9 is capable of electric conduction in the direction approximately perpendicular to the stacking direction, that is, in the plane direction, the above-described functions and effects can be obtained irrespective of the thickness of the current-collecting layer 9. For this reason, the thickness of the current-collecting layer 9 can be made to be extremely small within a range such that the current-collecting layer 9 is capable of electric conduction in the plane direction.

Further, since the current-collecting layer 9 does not need to be ion-conductively insulating, the above-described effect can be obtained when the current-collecting layer 9 is capable of electric conduction in the plane direction even if the current-collecting layer 9 has pores therein. Therefore, a method of forming the current-collecting layer 9 is not also particularly limited, and for example, the current-collecting layer 9 may be constituted by preparing an electroconductive material into a paste and applying the paste by screen printing.

The kind of the electroconductive material that forms the current-collecting layer 9 is not particularly limited as long as the material has an electric conduction property; however, the electroconductive material may be an electroconductive oxide, a metal, a mixture of an electroconductive oxide with a metal, or the like.

In the laminate type solid secondary battery 30 as well, the functions and effects similar to those of the laminate type solid secondary battery 10 shown in FIG. 1 can be obtained.

Fourth Embodiment

Next, a laminate type solid secondary battery having a basic structure of the laminate type solid secondary battery 10 shown in FIG. 1 will be described as the fourth embodiment of this invention.

Figure 5:
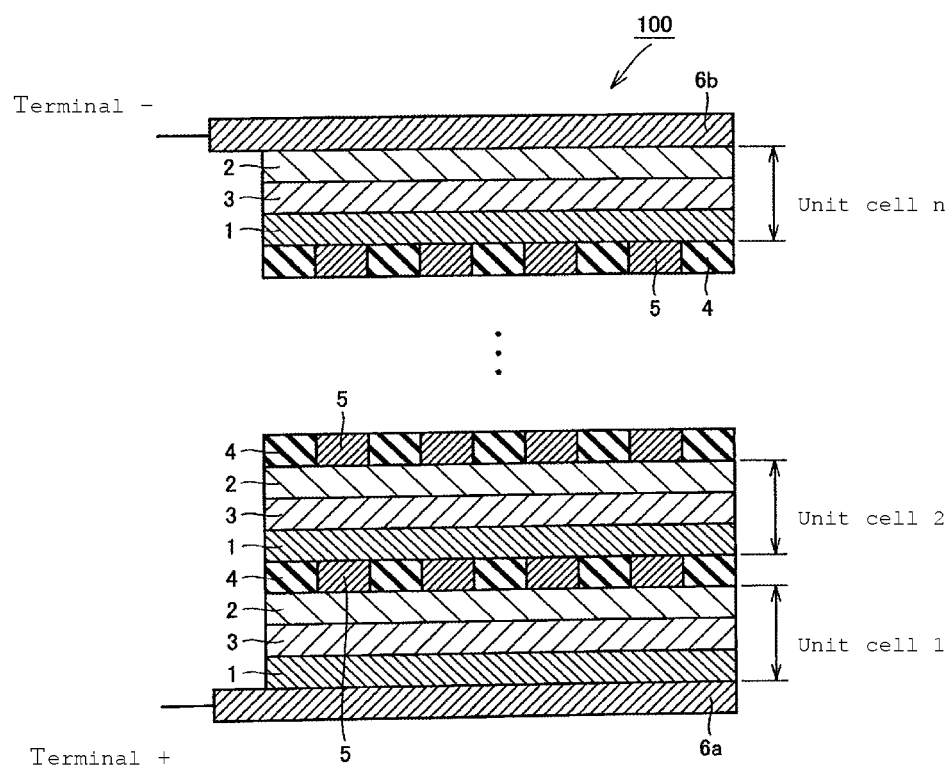
FIG. 5 is a cross-sectional view schematically illustrating a cross-sectional structure of a laminate type solid secondary battery as the fourth embodiment of this invention.

Referring to FIG. 5, in a laminate type solid secondary battery 100, n pieces of unit cells 1 to n are stacked via an intercellular separation structure body in the same manner as in FIG. 1. The n pieces of unit cells 1 to n are stacked via n−1 pieces of the insulating layers 4 so that the positive electrode layer 1 (the negative electrode layer 2) of each of the unit cells 1 to n will be disposed on the same side relative to the stacking direction. External electrodes 6a and 6b are disposed on the outside surface of a laminate body formed by stacking n pieces of the unit cells. Specifically, in the unit cell 1 positioned at the lowermost stage which is one end of the laminate body, the external electrode 6a having an electric conduction property is disposed on the surface of the positive electrode layer 1 that is not adjacent to the solid electrolyte layer 3. In the unit cell n positioned at the uppermost stage which is the other end of the laminate body, the external electrode 6b having an electric conduction property is disposed on the surface of the negative electrode layer 2 that is not adjacent to the solid electrolyte layer 3. By connecting the external electrode 6a to a positive electrode terminal and connecting the external electrode 6b to a negative electrode terminal, charging and discharging are carried out.

In the laminate type solid secondary battery 100 constituted as shown above, the two unit cells adjacent to the insulating layer 4 are connected electrically in series without using an external current-collecting member such as a leading tab because the electroconductive section 5 disposed in the insulating layer 4 is in contact with the positive electrode layer 1 and the negative electrode layer 2 adjacent to the insulating layer 4. Also, the positive electrode layer 1 of a unit cell and the negative electrode layer 2 of a unit cell adjacent to each other are ion-conductively insulated from each other by stacking the two unit cells adjacent to each other via the insulating layer 4.

This allows that the laminate type solid secondary battery 100 in which n pieces of the unit cells are connected electrically in series can be constituted without using an external current-collecting member such as a leading tab or a current-collecting layer.

Here, a method of constituting the laminate type solid secondary battery 100 of the present embodiment is not particularly limited, and for example, a method of constituting the unit cells 1 to n and the insulating layer 4 first and then sequentially stacking these to sandwich these with a pair of the external electrodes 6a and 6b to form the laminate type solid secondary battery 100, or a method of sequentially stacking the positive electrode layer 1, the solid electrolyte layer 3, and the negative electrode layer 2 on the external electrode 6a and finally stacking the external electrode 6b to form the laminate type solid secondary battery 100 may be adopted.

Here, the kind of the electroconductive material is not particularly limited; however, the electroconductive material can be selected from an electroconductive oxide, a metal, a mixture of an electroconductive oxide with a metal, and the like. A method of forming the electroconductive section 5 is not particularly limited, and a method such as constituting the electroconductive section 5 by preparing a paste-like electroconductive material in a paste form and filling the through-hole with the electroconductive material or by disposing a metal wire in the through-hole may be adopted.

The kind of a material constituting the external electrodes 6a and 6b is not particularly limited as long as the material has an electric conduction property; however, the material may be selected from an electroconductive oxide, a metal, a mixture of an electroconductive oxide with a metal, and the like. A method of forming the external electrodes 6a and 6b is not also particularly limited, and for example, the external electrodes 6a and 6b may be constituted by preparing an electroconductive material into a paste and applying this paste by screen printing.

Also, an insulating layer may be disposed instead of the external electrodes 6a and 6b, and an electroconductive section disposed in the insulating layer may be connected to the positive electrode terminal and the negative electrode terminal.

Fifth Embodiment

Next, a laminate type solid secondary battery having a basic structure of the laminate type solid secondary battery 20 shown in FIG. 2 will be described as the fifth embodiment of this invention.

Figure 6:
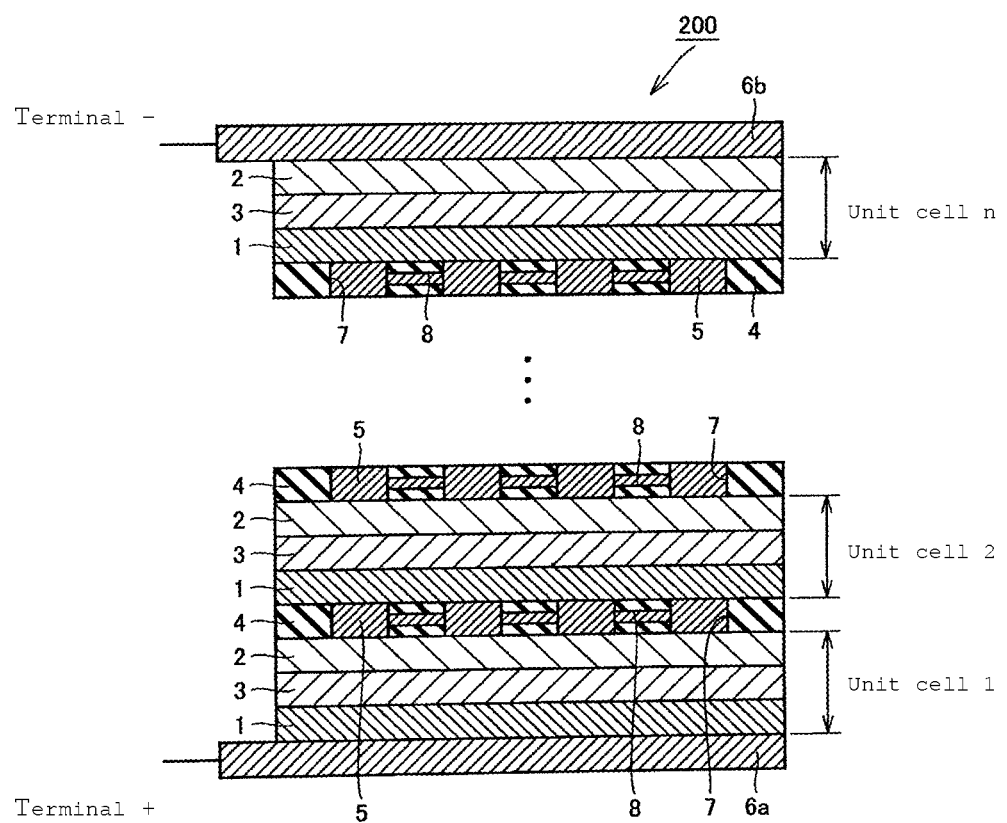
FIG. 6 is a cross-sectional view schematically illustrating a cross-sectional structure of a laminate type solid secondary battery as the fifth embodiment of this invention.

Referring to FIG. 6, in a laminate type solid secondary battery 200, n pieces of unit cells 1 to n are stacked via an intercellular separation structure body in the same manner as in FIG. 2. The first through-hole 7 and the second through-hole 8 are formed in the insulating layer 4. The second through-hole 8 is formed so that a plurality of adjacent first through-holes 7 may be in communication with each other. The first through-hole 7 is formed so as to penetrate through the insulating layer 4 in the stacking direction, and the second through-hole 8 is formed so as to penetrate through the insulating layer 4 by extending in a direction approximately orthogonal to the stacking direction, that is, the plane direction. The second through-hole 8 forms a hollow structure in the insulating layer 4. By filling the first and second through-holes 7 and 8 each with an electroconductive material, the electroconductive section 5 including first and second electroconductive sections is formed. In this manner, in the electroconductive section 5, the first and second electroconductive sections formed by respectively filling the first and second through-holes 7 and 8 with an electroconductive material are electrically connected with each other.

Here, the other constitution of the laminate type solid secondary battery 200 is the same as that of the laminate type solid secondary battery 100 shown in FIG. 5.

In the laminate type solid secondary battery 200 constituted as shown above, by forming the first through-hole 7 to extend in the stacking direction of the insulating layer 4 for electrically connecting the two unit cells adjacent to each other, and forming the second through-hole 8 in a direction approximately orthogonal to the stacking direction of the insulating layer 4, that is, the plane direction, and filling the first and second through-holes 7 and 8 with an electroconductive material, the electroconductive section 5 extending in the stacking direction and in the plane direction in the insulating layer 4 is formed. This allows that, by electrically connecting the electroconductive section 5 in the stacking direction and in the plane direction in the insulating layer 4, the value of the electric current flowing through the electroconductive section 5 can be averaged in the plane direction of the insulating layer 4. As a result, the electric resistance of the insulating layer 4 in the stacking direction can be reduced.

Therefore, the laminate type solid secondary battery 200 with reduced electric resistance as compared with the laminate type solid secondary battery 100 is constituted without using an external current-collecting member such as a leading tab or a current-collecting layer.

Here, the laminate type solid secondary battery 200 is described as an example in which the approximately cylindrical first through-holes 7 are arranged at an equal interval in the insulating layer 4, and the second through-hole 8 having a hollow structure and formed in the insulating layer 4 connects all of the first through-holes 7. However, the shape, disposition, and number of the first through-holes 7 and the second through-holes 8 are not particularly limited, and the same effect can be obtained even when some of the first through-holes 7 are connected by the second through-hole 8.

Also, in the laminate type solid secondary battery 200 as well, the functions and effects similar to those of the laminate type solid secondary battery 100 shown in FIG. 5 can be obtained.

Sixth Embodiment

Next, a laminate type solid secondary battery having a basic structure of the laminate type solid secondary battery 30 shown in FIG. 4 will be described as the sixth embodiment of this invention.

Figure 7:
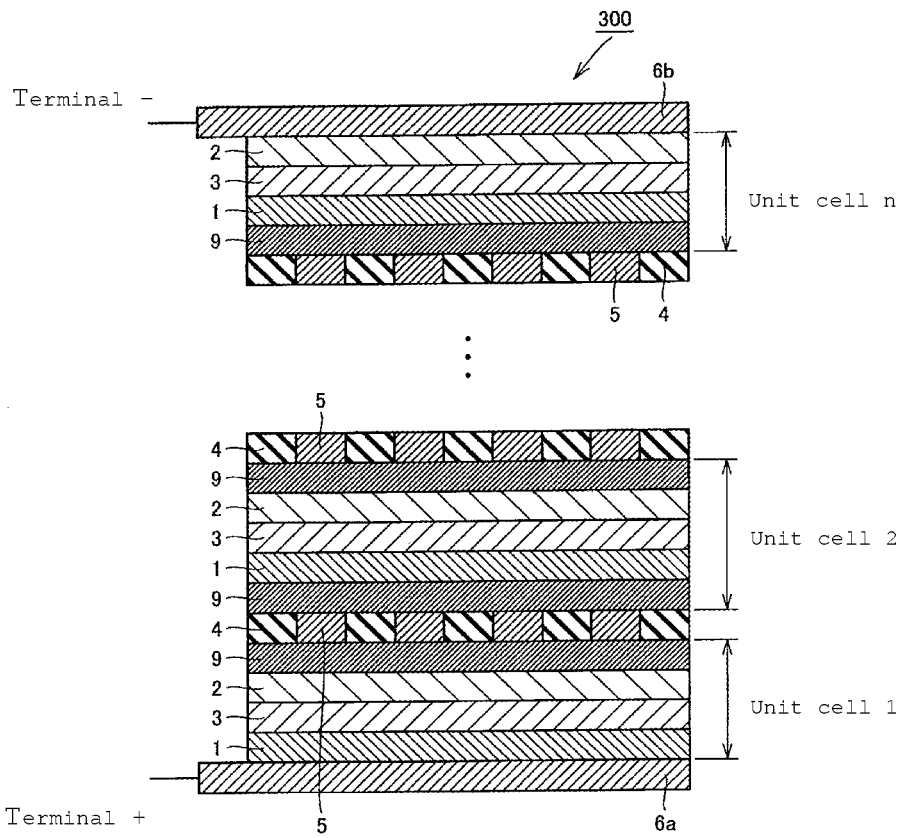
FIG. 7 is a cross-sectional view schematically illustrating a cross-sectional structure of a laminate type solid secondary battery as the sixth embodiment of this invention.

Referring to FIG. 7, in a laminate type solid secondary battery 300, n pieces of unit cells 1 to n are stacked via an intercellular separation structure body in the same manner as in FIG. 4. In each unit cell, for example, in the unit cell 2, the current-collecting layer 9 having an electric conduction property is formed on the surface of the negative electrode layer 2 disposed on the side of the intercellular separation structure body, that is, on the side of the insulating layer 4. Also, in each unit cell, for example, in the unit cell 2, the current-collecting layer 9 having an electric conduction property is formed also on the surface of the positive electrode layer 1 disposed on the side of the intercellular separation structure body, that is, on the side of the insulating layer 4. In other words, each unit cell is constituted by disposing the current-collecting layer 9 having an electric conduction property on the surface of each of the positive electrode layer 1 and the negative electrode layer 2 that is not adjacent to the solid electrolyte layer 3. Here, the current-collecting layer 9 may be disposed on one of the positive electrode layer 1 and the negative electrode layer 2 disposed on the side of the insulating layer 4.

Here, the other constitution of the laminate type solid secondary battery 300 is the same as that of the laminate type solid secondary battery 100 shown in FIG. 5.

In the laminate type solid secondary battery 300 constituted as shown above, by disposing the current-collecting layer 9 having an electric conduction property between the positive electrode layer 1 (the negative electrode layer 2) and the insulating layer 4, the electric current passing through the current-collecting layer 9 can be averaged in the direction perpendicular to the stacking direction, and the local electric current concentration within each unit cell can be restrained. As a result, the electric resistance of the laminate type solid secondary battery 300 can be reduced.

Therefore, the laminate type solid secondary battery 300 with reduced electric resistance as compared with the laminate type solid secondary battery 100 is constituted without using an external current-collecting member such as a leading tab or a current-collecting layer.

Here, the laminate type solid secondary battery 300 is described as an example in which the current-collecting layer 9 is disposed on all of the positive electrode layers 1 and the negative electrode layers 1 that are not adjacent to the external electrodes. However, the above functions and effects can be obtained as well even when the current-collecting layer 9 is disposed only on the positive electrode layers 1 or only on the negative electrode layers 2.

Also, when the current-collecting layer 9 is capable of electric conduction in the direction approximately perpendicular to the stacking direction, that is, in the plane direction, the above-described functions and effects can be obtained irrespective of the thickness of the current-collecting layer 9. For this reason, the thickness of the current-collecting layer 9 can be made to be extremely small within a range such that the current-collecting layer 9 is capable of electric conduction in the plane direction.

Further, since the current-collecting layer 9 does not need to be ion-conductively insulating, the above-described effect can be obtained when the current-collecting layer 9 is capable of electric conduction in the plane direction even if the current-collecting layer 9 has pores therein. Therefore, a method of forming the current-collecting layer 9 is not also particularly limited, and for example, the current-collecting layer 9 may be constituted by preparing an electroconductive material into a paste and applying the paste by screen printing.

The kind of the electroconductive material that forms the current-collecting layer 9 is not particularly limited as long as the material has an electric conduction property; however, the electroconductive material may be an electroconductive oxide, a metal, a mixture of an electroconductive oxide with a metal, or the like.

In the laminate type solid secondary battery 300 as well, the functions and effects similar to those of the laminate type solid secondary battery 100 shown in FIG. 5 can be obtained.

Seventh Embodiment

Next, a structure of a laminate type solid secondary battery to which the laminate type solid secondary battery 100 shown in FIG. 5 has been applied will be described as the seventh embodiment of this invention.

Figure 8:
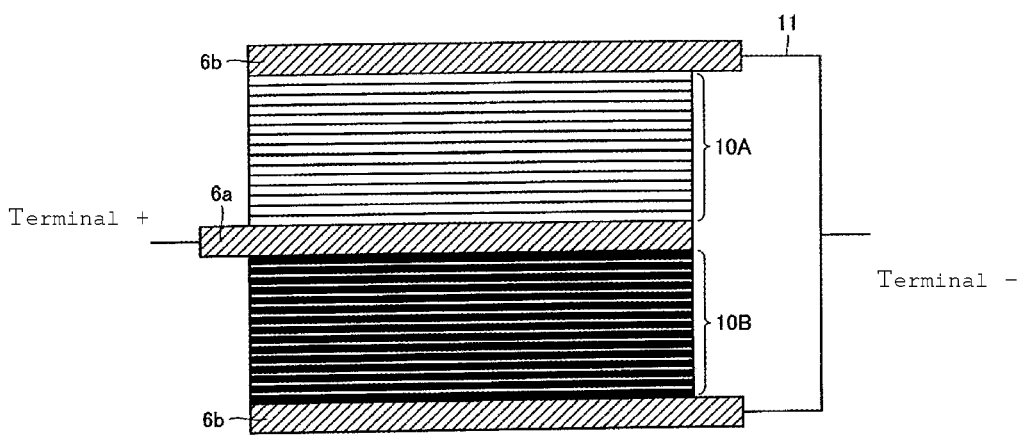
FIG. 8 is a cross-sectional view schematically illustrating a cross-sectional structure of a laminate type solid secondary battery as the seventh embodiment of this invention.
Figure 9:
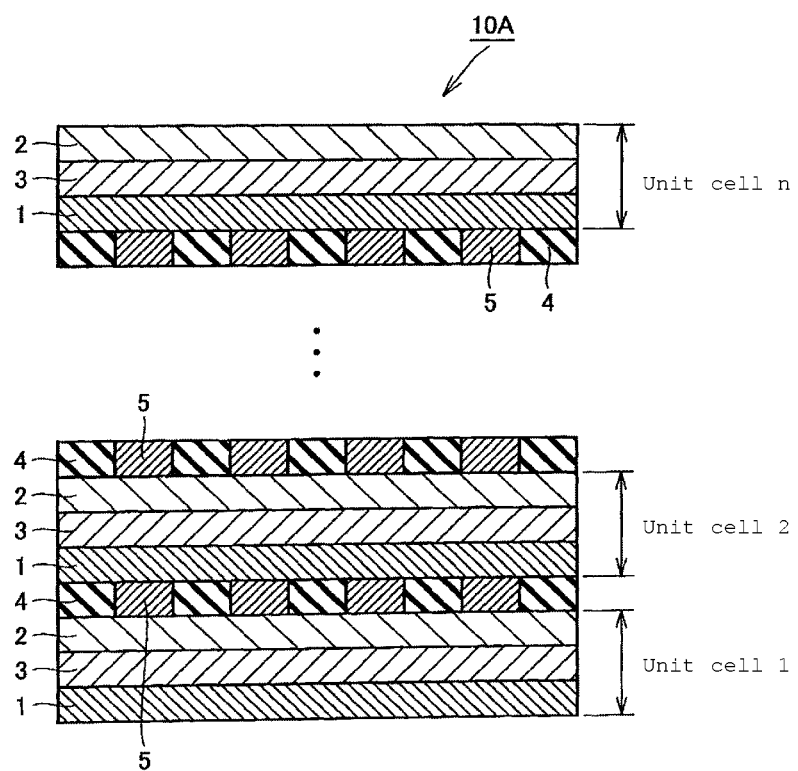
FIG. 9 is a cross-sectional view schematically illustrating a cross-sectional structure of a first power-generating element in the laminate type solid secondary battery as the seventh embodiment of this invention.
Figure 10:
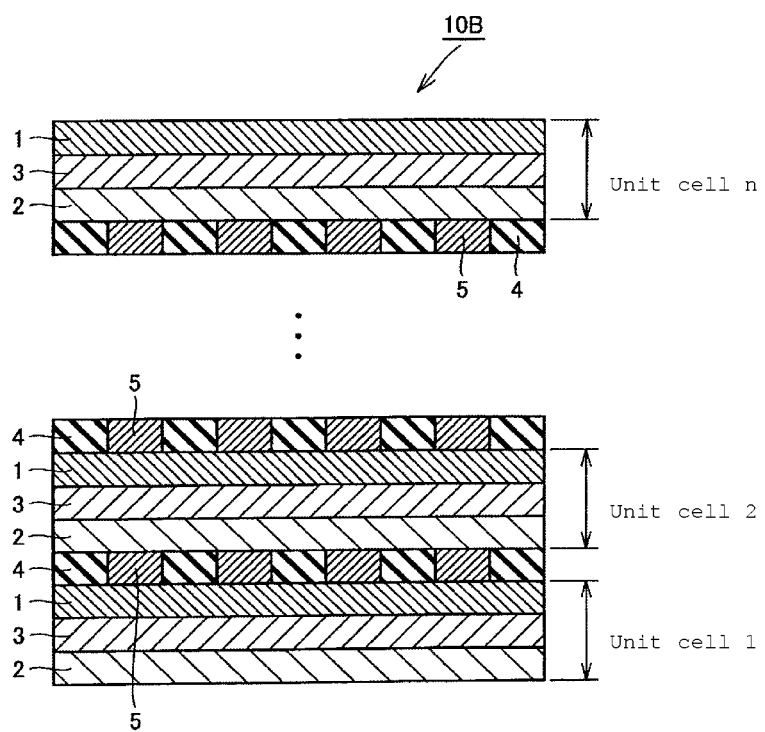
FIG. 10 is a cross-sectional view schematically illustrating a cross-sectional structure of a second power-generating element in the laminate type solid secondary battery as the seventh embodiment of this invention.

Referring to FIG. 8, two power-generating elements 10A and 10B each of which is constituted by connecting n pieces of unit cells in series are stacked via the external electrode 6a and connected electrically in parallel to constitute a laminate type solid secondary battery. Referring to FIGS. 9 and 10, the two power-generating elements 10A and 10B are each constituted by stacking n pieces of unit cells 1 to n via n−1 pieces of the insulating layers 4. In other words, in each of the power-generating elements 10A and 10B, n pieces of unit cells are connected electrically in series in the same manner as in the laminate type solid secondary battery 100 shown in FIG. 5.

Referring to FIGS. 8 to 10, the power-generating element 10A is formed as a first laminate body by stacking n pieces of unit cells, and the power-generating element 10B is formed as a second laminate body by stacking n pieces of unit cells. The external electrode 6a is disposed as a first external electrode between the positive electrode layer 1 positioned on one side surface of the power-generating element 10A and the positive electrode layer 1 positioned on one side surface of the power-generating element 10B. In other words, the positive electrode layers 1 are respectively adjacent to both surfaces of the external electrode 6a that intervenes between the two power-generating elements 10A and 10B. The external electrode 6b is disposed as a second external electrode on the negative electrode layer 2 positioned on the other side surface of the power-generating element 10A. Another external electrode 6b is disposed as a third external electrode on the negative electrode layer 2 positioned on the other side surface of the power-generating element 10B. In this manner, the external electrode 6b is disposed also on the surfaces located at the uppermost stage and at the lowermost stage constituting the ends of the laminate body shown in FIG. 8. Further, the two external electrodes 6b and 6b are electrically connected via an external current-collecting member 11. Therefore, the two power-generating elements 10A and 10B are connected electrically in parallel via the external electrodes 6a and 6b. Charging and discharging are carried out by connecting the external electrode 6a to a positive electrode terminal and connecting the external electrode 6b to a negative electrode terminal.

In the laminate type solid secondary battery constituted as shown above, the power-generating elements 10A and 10B, each of which is constituted by connecting n pieces of unit cells 1 to n electrically in series, are connected electrically in parallel, whereby a double capacity can be exhibited with the same voltage as that of the laminate type solid secondary battery 100 shown in FIG. 5.

Here, in the present embodiment, a laminate type solid secondary battery has been described in which the positive electrode layers 1 are adjacent respectively to both surfaces of the external electrode 6a that intervenes between the two power-generating elements 10A and 10B; however, the two power-generating elements 10A and 10B may be disposed so that the negative electrode layers 2 may be adjacent.

In the laminate type solid secondary battery shown in FIG. 8 as well, the functions and effects similar to those of the laminate type solid secondary battery 100 shown in FIG. 5 can be obtained.

Eighth Embodiment

Finally, as the eighth embodiment of this invention, a modification of the seventh embodiment providing a structure of a laminate type solid secondary battery to which the laminate type solid secondary battery 100 shown in FIG. 5 has been applied will be described.

Figure 11:
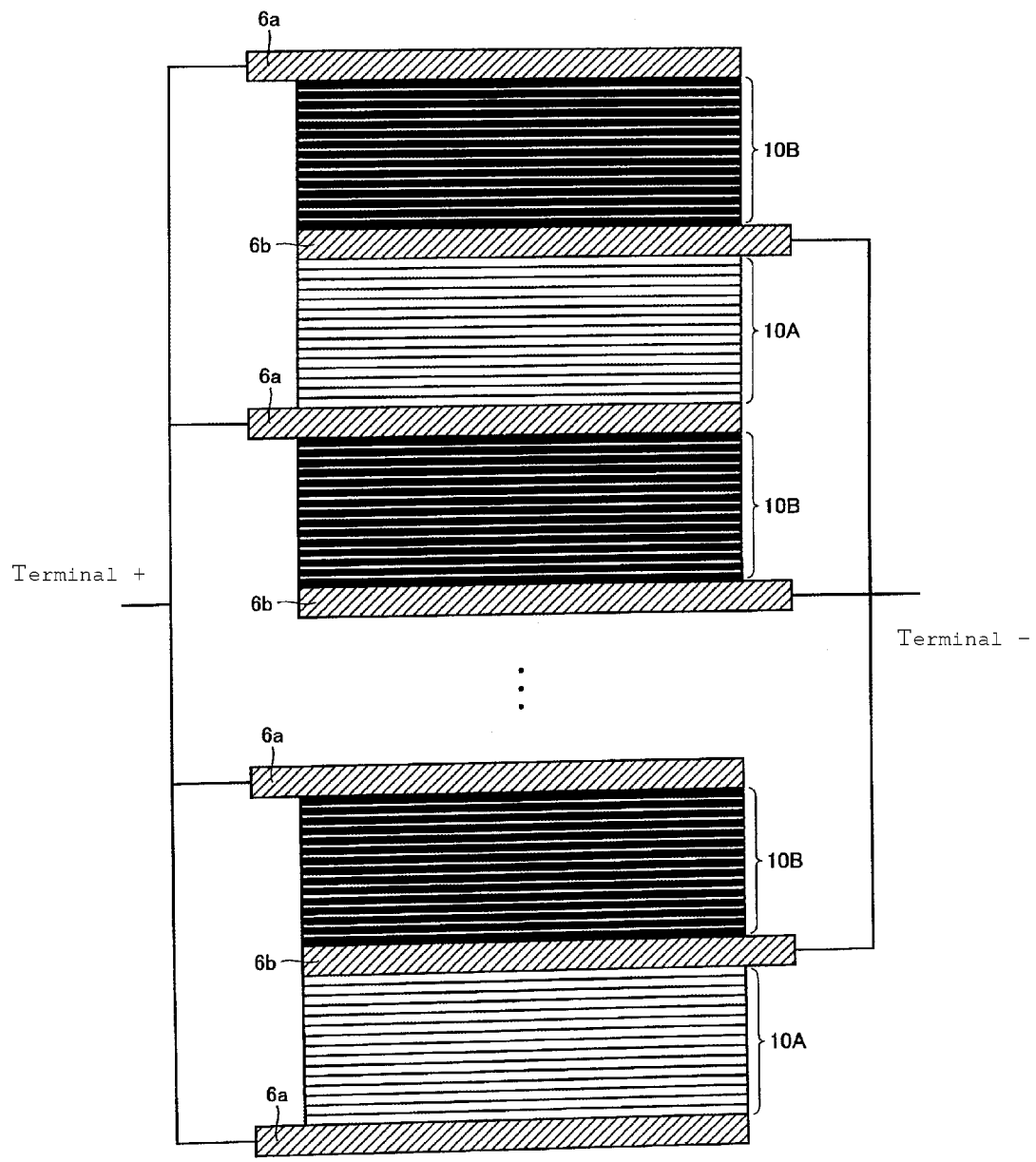
FIG. 11 is a cross-sectional view schematically illustrating a cross-sectional structure of a laminate type solid secondary battery in a case in which an even number of power-generating elements are present as the eighth embodiment of this invention.
Figure 12:
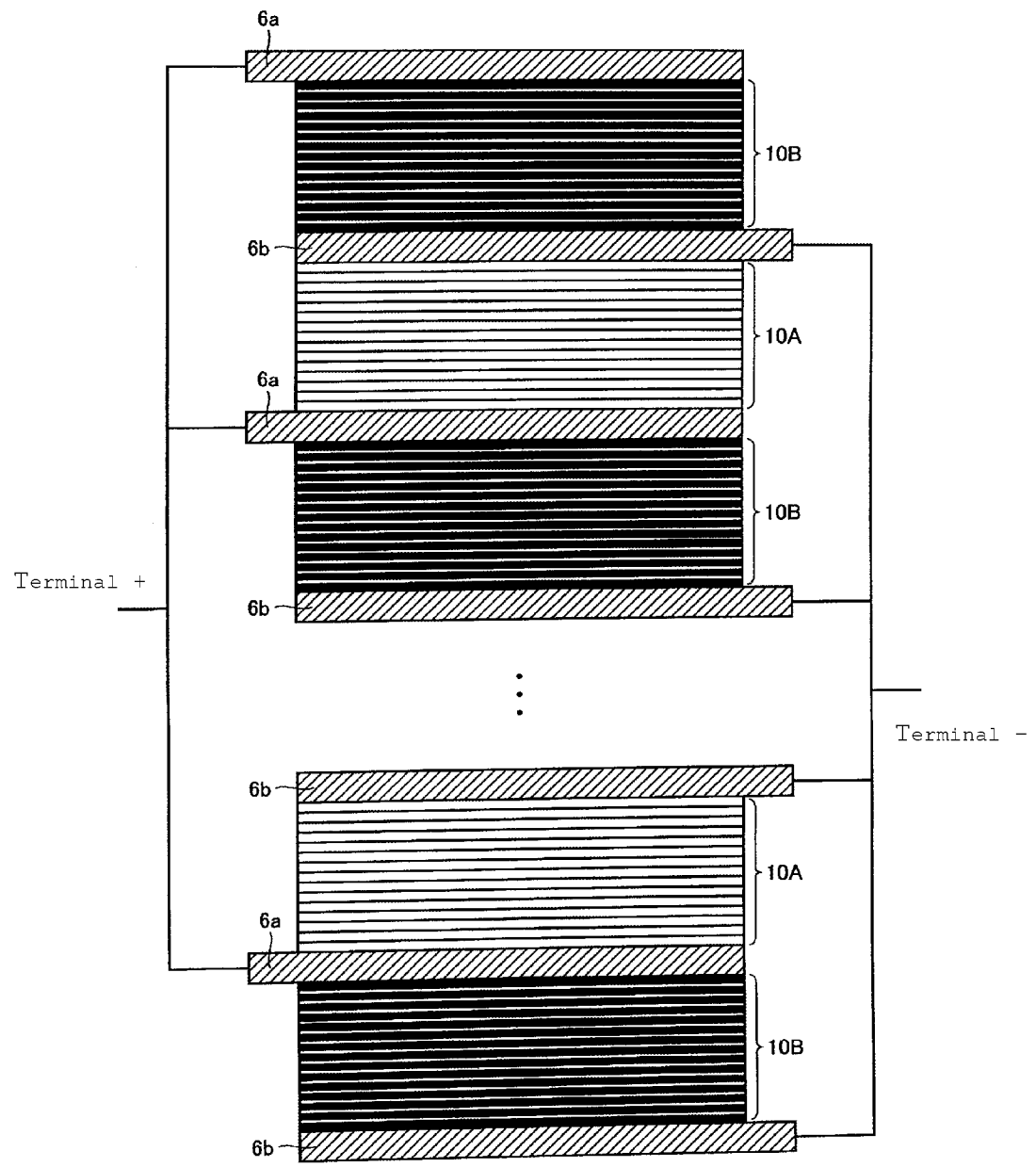
FIG. 12 is a cross-sectional view schematically illustrating a cross-sectional structure of a laminate type solid secondary battery in a case in which an odd number of power-generating elements are present as the eighth embodiment of this invention.

Referring to FIGS. 9 to 12, a plurality of the power-generating elements 10A and 10B, each of which is constituted by connecting n pieces of unit cells in series, are stacked with the external electrode 6a or the external electrode 6b intervening between the two adjacent power-generating elements 10A and 10B and are connected electrically in parallel to constitute a laminate type solid secondary battery. FIG. 11 shows a cross-sectional structure of a laminate type solid secondary battery in a case in which an even number of power-generating elements are provided. FIG. 12 shows a cross-sectional structure of a laminate type solid secondary battery in a case in which an odd number of power-generating elements are provided. The two power-generating elements 10A and 10B are each constituted by stacking n pieces of unit cells 1 to n via n−1 pieces of the insulating layers 4. In other words, in each of the power-generating elements 10A and 10B, n pieces of unit cells are connected electrically in series in the same manner as in the laminate type solid secondary battery 100 shown in FIG. 5.

The external electrode 6a is disposed as a first external electrode between the positive electrode layer 1 positioned on one side surface of the power-generating element 10A and the positive electrode layer 1 positioned on one side surface of the power-generating element 10B. Also, the external electrode 6b is disposed as a first external electrode between the negative electrode layer 2 positioned on one side surface of the power-generating element 10A and the negative electrode layer 2 positioned on one side surface of the power-generating element 10B. In other words, the positive electrode layers 1 are respectively adjacent to both surfaces of the external electrode 6a that intervenes between the two power-generating elements 10A and 10B. The negative electrode layers 1 are respectively adjacent to both surfaces of the external electrode 6b that intervenes between the two power-generating elements 10A and 10B.

The external electrode 6a or the external electrode 6b is also disposed on the surfaces located at the uppermost stage and at the lowermost stage constituting the ends of laminate bodies shown in FIGS. 11 and 12. Further, a plurality of the external electrodes 6a and 6a and a plurality of the external electrodes 6b and 6b are electrically connected. Therefore, the plurality of the power-generating elements 10A and 10B are connected electrically in parallel via the external electrodes 6a and 6b. Charging and discharging are carried out by connecting the external electrode 6a to a positive electrode terminal and connecting the external electrode 6b to a negative electrode terminal.

In the laminate type solid secondary battery constituted as shown above, an even number or an odd number of the power-generating elements 10A and 10B, each of which is constituted by connecting n pieces of unit cells 1 to n electrically in series, are connected electrically in parallel, whereby a capacity of an even number multiple or an odd number multiple can be exhibited with the same voltage as that of the laminate type solid secondary battery 100 shown in FIG. 5.

In the laminate type solid secondary batteries shown in FIGS. 11 and 12 as well, the functions and effects similar to those of the laminate type solid secondary battery 100 shown in FIG. 5 can be obtained.

Here, in each of the laminate type solid secondary batteries according to the first to eighth embodiments, each constituent element can be realized by using materials shown below.

The solid electrolyte layer 3 contains a solid electrolyte as a major material. As the solid electrolyte, a NASICON type solid electrolyte such as $Li_{1.5}Al_{0.5}Ge_{1.5}(PO_4)_3$ or $Li_{1.2}Al_{0.3}Ti_{1.7}(PO_4)_3$ can be used; however, the material is not particularly limited.

The positive electrode layer 1 contains a mixture of a positive electrode active substance and a solid electrolyte (for example, mass ratio of 1:1) as a major material. As the positive electrode active substance, a NASICON type active substance such as $Li_3V_2(PO_4)_3$, an olivine type active substance such as $LiFePO_4$, or the like can be used; however, the material is not particularly limited. Also, the positive electrode layer 1 may contain a small amount of carbon or the like as an electronic conduction material.

The negative electrode layer 2 contains a mixture of a negative electrode active substance and a solid electrolyte (for example, mass ratio of 1:1) as a major material. As the negative electrode active substance, a NASICON type active substance such as $Li_3V_2(PO_4)_3$, an olivine type active substance such as $LiCuPO_4$, $Li_4Ti_5O_{12}$, or the like can be used; however, the material is not particularly limited. Also, the negative electrode layer 2 may contain a small amount of carbon or the like as an electronic conduction material.

The insulating layer 4 contains an $Al_2O_3$ powder and borosilicate-based glass as a major material, or alternatively, the insulating layer 4 may be constituted by fusing an insulating ceramic such as an $Al_2O_3$ powder with a glass frit such as borosilicate-based glass. The materials of the insulating ceramic and the glass frit are not particularly limited. The insulating ceramic may be constituted by sintering without using a glass frit.

Regarding the electroconductive material constituting the electroconductive section 5, the current-collecting layer 8, or the external electrodes 6a, 6b, lanthanum chromite or the like can be used as the electroconductive oxide, and Ni, Cu, Ag, or the like can be used as the metal. As the metal, a metal in paste form may be used, or a metal in a bulk form may be used.

It should be considered that the embodiments disclosed herein are in all respects exemplary and not restrictive. It is intended that the scope of the present invention is shown not by the above-described embodiments but by the claims and includes all the modifications and changes equivalent to and within the scope of the claims.

According to the intercellular separation structure body of the present invention, unit cells constituting a laminate type solid secondary battery can be electrically connected while reducing the number of external current-collecting members such as leading tabs as much as possible, and also a positive electrode layer and a negative electrode layer can be ion-conductively insulated from each other efficiently irrespective of the presence or absence of a current-collecting layer, so that a laminate type secondary battery being excellent in space utilization ratio and cost performance can be obtained.

DESCRIPTION OF REFERENCE SYMBOLS

1: positive electrode layer,
2: negative electrode layer,
3: solid electrolyte layer,
4: insulating layer,
5: electroconductive section,
10, 20, 30, 100, 200, 300: laminate type solid secondary battery

The invention claimed is:

1. An intercellular separation structure body configured to be disposed between a plurality of unit cells each of which includes a positive electrode layer, a solid electrolyte layer, and a negative electrode layer sequentially stacked in a laminate type solid secondary battery, the intercellular separation structure body comprising:
   an insulating section that electroconductively and ion-conductively insulates the plurality of unit cells from each other; and
   an electroconductive section within the insulating section and which electrically connects the plurality of unit cells with each other,
   wherein the insulating section and the electroconductive section are co-sintered.

2. The intercellular separation structure body according to claim 1, wherein the electroconductive section comprises an electroconductive material that fills at least one through-hole in the insulating section.

3. The intercellular separation structure body according to claim 2, wherein the electroconductive material comprises at least one material selected from the group consisting of an electroconductive oxide and a metal.

4. The intercellular separation structure body according to claim 2, wherein the insulating section includes first and second through-holes, first and second electroconductive sections respectively fill the first and second through-holes with the electroconductive material, and the first and second electroconductive sections are electrically connected with each other.

5. A laminate type solid secondary battery comprising:
a plurality of unit cells each of which includes a positive electrode layer, a solid electrolyte layer, and a negative electrode layer that are sequentially stacked; and
the intercellular separation structure body according to claim 1 disposed between the plurality of unit cells.

6. The laminate type solid secondary battery according to claim 5, wherein at least one of the plurality of unit cells further comprises a current-collecting layer disposed on at least one of the positive electrode layer and the negative electrode layer, the current-collecting layer having an electroconductive property.

7. The laminate type solid secondary battery according to claim 6, wherein the current-collecting layer comprises at least one material selected from the group consisting of an electroconductive oxide and a metal.

8. The laminate type solid secondary battery according to claim 5, further comprising an external electrode disposed on an outside surface of a laminate body formed by the stacked plurality of unit cells.

9. The laminate type solid secondary battery according to claim 8, wherein the external electrode comprises at least one material selected from the group consisting of an electroconductive oxide and a metal.

\* \* \* \* \*